United States Patent
Bergherm

(10) Patent No.: US 9,963,626 B2
(45) Date of Patent: May 8, 2018

(54) ANTI-SKID COMPOSITIONS AND METHODS OF MAKING AND USING THE SAME

(71) Applicant: RAINFOREST TECHNOLOGIES, LLC, Las Vegas, NV (US)

(72) Inventor: Brent Bergherm, Euharlee, GA (US)

(73) Assignee: Rainforest Technologies, LLC, Las Vegas, NV (US)

( * ) Notice: Subject to any disclaimer, the term of this patent is extended or adjusted under 35 U.S.C. 154(b) by 0 days. days.

(21) Appl. No.: 15/126,003

(22) PCT Filed: Mar. 13, 2015

(86) PCT No.: PCT/US2015/020321
§ 371 (c)(1),
(2) Date: Sep. 14, 2016

(87) PCT Pub. No.: WO2015/138823
PCT Pub. Date: Sep. 17, 2015

(65) Prior Publication Data
US 2017/0174964 A1  Jun. 22, 2017

Related U.S. Application Data

(60) Provisional application No. 61/953,018, filed on Mar. 14, 2014.

(51) Int. Cl.

| | | |
|---|---|---|
| *C09K 3/14* | (2006.01) | |
| *C09D 5/02* | (2006.01) | |
| *C08K 3/26* | (2006.01) | |
| *C09D 157/06* | (2006.01) | |
| *C09D 7/00* | (2018.01) | |
| *C09D 7/12* | (2006.01) | |
| *C09D 133/02* | (2006.01) | |
| *C09D 133/08* | (2006.01) | |

(52) U.S. Cl.
CPC .............. *C09K 3/149* (2013.01); *C09D 5/021* (2013.01); *C09D 5/024* (2013.01); *C09D 7/002* (2013.01); *C09D 7/1233* (2013.01); *C09D 7/43* (2018.01); *C09D 7/63* (2018.01); *C09D 133/02* (2013.01); *C09D 133/08* (2013.01); *C09D 157/06* (2013.01); *C08K 2003/265* (2013.01)

(58) Field of Classification Search
CPC .... C09D 5/021; C09D 133/02; C09D 133/08; C08K 3/14; C08K 3/149; C09K 3/14; C09K 3/149
See application file for complete search history.

(56) References Cited

U.S. PATENT DOCUMENTS

| | | | | |
|---|---|---|---|---|
| 3,953,386 | A  * | 4/1976 | Murphy ................ | C08F 291/00 524/716 |
| 6,706,800 | B2 | 3/2004 | Tanno et al. | |
| 7,176,258 | B2 * | 2/2007 | Morihiro ............... | C08F 265/06 525/197 |
| 7,713,365 | B2 | 5/2010 | Silvers et al. | |
| 8,044,056 | B2 * | 10/2011 | Isobe .................... | C07D 473/00 514/252.16 |
| 2011/0027600 | A1* | 2/2011 | Hayes .................... | C08L 33/08 428/500 |
| 2012/0258066 | A1* | 10/2012 | Weber .................. | A61K 8/8152 424/70.16 |
| 2013/0101543 | A1* | 4/2013 | Tamareselvy ............ | C08F 2/00 424/70.11 |

FOREIGN PATENT DOCUMENTS

| | | |
|---|---|---|
| EP | 0728779 | 8/1996 |
| KR | 20050090673 | 9/2005 |
| KR | 101045361 | 6/2011 |
| WO | 2010107697 | 9/2010 |
| WO | 2013109576 | 7/2013 |

OTHER PUBLICATIONS

International Search Report and Written Opinion for PCT/US15/20321 dated Jun. 25, 2015.
European Search Report for 15761916.4 dated Sep. 26, 2017.

* cited by examiner

*Primary Examiner* — Vickey Nerangis
(74) *Attorney, Agent, or Firm* — Gardner Groff Greenwald & Villanueva, PC

(57) ABSTRACT

Described herein are anti-skid compositions that exhibit good mechanical strength, water resistance, and minimal product transfer. In certain aspects, the anti-skid compositions can be applied to articles using an aerosol delivery system. The anti-skid compositions can be applied to any article such as, for example, a rug, floor mat, chair mat, runner, and the like. The anti-skid compositions are particularly effective in preventing sliding or skidding of area rugs on or across substrates such as, for example, hard floors.

23 Claims, No Drawings

ANTI-SKID COMPOSITIONS AND METHODS OF MAKING AND USING THE SAME

CROSS REFERENCE TO RELATED APPLICATION

This application claims priority upon U.S. Provisional Application Ser. No. 61/953,018, filed Mar. 14, 2014. This application is hereby incorporated by reference in its entirety for all of its teachings.

BACKGROUND

Pedestrian traffic, the movement of heavy objects, and the like can cause rugs, mats, and other floor coverings to slide across the surfaces to which they are applied. This sliding or skidding may result in falls or injuries, as well as the contact of objects with a floor in a way that can damage the floor. Further, the movement of floor coverings can be aesthetically unpleasing and can result in dirt or debris being tracked into a room, for example, if a door mat slides out of place.

The problem of displacement of floor coverings has been solved in the past through the use of several strategies. For example, floor mats may be made primarily of rubber, or anti-slip pads and mats can be used. However, these solutions can have certain disadvantages. Anti-slip pads and mats may not be water resistant and are often not available in the exact sizes needed for various floor coverings. Further, anti-slip pads without adequate grip or tack can actually make rug sliding problems worse.

One solution to these problems would be a backing composition that could be applied to an article such as a rug or floor mat. This composition could be packaged in a pressurized system for applying as an aerosol or spray. The use of such a system would provide an easy way to apply the composition over the back of the article, covering only the area needed. However, there are some considerations when using such a system. Traditional compositions for packaging into pressurized containers have been solvent-based compounds because of good solubility, low cost, and solvency in standard pressure propellant systems such as, for example, propane, butane, isobutene, and blends thereof, or in high pressure propellant systems such as those using nitrogen or carbon dioxide. The majority of these traditional systems usually contain at least some volatile organic compounds (VOCs) or some level of flammability. Solvent-based systems also usually carry with them a number of health hazards, environmental concerns, or the possibility of being explosive in nature. As local, state, and national governmental regulations have been tightening the requirements for aerosol products with respect to VOCs, it has become necessary to research environmentally-friendly alternatives to traditional, organic solvent-based systems.

It would thus be desirable to create an aqueous, sprayable composition that could be applied to an article and that could impart anti-slip or anti-skid properties to that article. Such a composition would exhibit good mechanical strength, a high degree of water resistance, sufficient grip or tack, low or no VOC emissions, and little or no product transfer to the substrate or surface on which the treated article was placed. The present invention addresses these needs.

SUMMARY

Described herein are anti-skid compositions that exhibit good mechanical strength, water resistance, and minimal product transfer. In certain aspects, the anti-skid compositions can be applied to articles using an aerosol delivery system. The anti-skid compositions can be applied to any article such as, for example, a rug, floor mat, chair mat, runner, and the like. The anti-skid compositions are particularly effective in preventing sliding or skidding of area rugs on or across substrates such as, for example, hard floors.

The advantages of the materials, methods, and devices described herein will be set forth in part in the description that follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present materials, articles, and/or methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an," and "the" include plural referents unless the context clearly dictates otherwise. Thus, for example, reference to "a filler" includes mixtures of two or more such fillers, and the like.

"Optional" or "optionally" means that the subsequently described event or circumstance can or cannot occur, and that the description includes instances where the event or circumstance occurs and instances where it does not. For example, the compositions described herein may optionally contain one or more fillers, where the filler may or may not be present.

As used herein, the term "about" is used to provide flexibility to a numerical range endpoint by providing that a given value may be "a little above" or "a little below" the endpoint without affecting the desired result.

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

An "aerosol" as used herein is a substance that is pressurized and that can be released as a fine spray. Typically, aerosols are colloids of solid particles or liquid suspended in a gas, such as a propellant gas.

"Skid" refers to the sliding motion of one object or article, such as a rug, horizontally across a substrate such as a floor. Skidding may result from the substrate being slippery and/or from a person stopping on the rug too quickly. "Non-skid" or "anti-skid" refers to compositions that provide adequate resistance to shear so that, when they are applied to an object or article, the object or article will not slide or will exhibit reduced tendencies to slide. Articles treated with "non-skid" or "anti-skid" compositions are not permanently bonded to the substrate; they can be lifted from the substrate and moved to new locations without transferring to the substrate or leaving any residue on the substrate.

"Tack" or "grip" as used herein refers to the ability of articles treated with the compositions disclosed herein to resist shear in a horizontal direction, or the ability of treated articles to stick to the substrate. Too much tack results in transfer of the compositions from the article to the substrate; too little tack can reduce non-skid properties and/or result in repeated separations of treated articles from the substrate when pressure is applied and removed. In one aspect, an article treated with a composition with a too-low amount of tack makes a noise when, for example, foot traffic steps on and off the article and the article separates from the floor. In one aspect, the compositions disclosed herein have balanced tack properties that eliminate both product transfer and noise while still resisting horizontal shear.

"Mechanical strength" as used herein refers to the behavior of the compositions disclosed herein when subjected to stresses and/or strains. A composition with good mechanical strength will, when dried, remain physically intact and will not rip or tear when pressure is applied.

An "aqueous" or "water-based" composition is one in which the primary solvent is water. Aqueous compositions may contain stabilizers, detergents, surfactants, emulsifiers, and the like, in order to solubilize non-hydrophilic components.

As used herein, "water resistance" refers to the ability of a compound, composition, or article to repel water or hinder the penetration of water into the body of the article.

In some aspects, a surface of an article that has been coated with a composition may be placed into contact with a substrate surface that has not been treated with the composition. "Transfer," in this case, refers to movement of some or all of the coating or composition to the untreated substrate surface. In one aspect, the coatings and compositions disclosed herein display little or no product transfer when the articles treated with said compositions are removed from the substrate surfaces.

"Glass transition temperature," abbreviated $T_g$, is the temperature range over which a polymer changes from a rigid, brittle, or "glassy" state to a pliable or "rubbery" state. This is a reversible transition associated with amorphous materials. The glass transition temperature is always lower than the melting temperature of the crystalline state of a material, and different polymers and polymer systems exhibit different glass transition temperatures.

A "plasticizer" is a substance added to a composition to promote flexibility and to reduce brittleness. Plasticizers can lower the overall glass transition temperature of a polymer or polymer system without weakening the mechanical strength of the final product.

"Phthalates," also known as "phthalate esters," are synthesized by reacting phthalic anhydride with alcohols and are commonly used as plasticizers. Phthalates can easily leach out of plastic materials and may be associated with negative health effects. "Non-phthalate" plasticizers can be structural isomers of phthalates (i.e., derivatives of, for example, terephthalic acid) or can be unrelated compounds. Non-phthalate plasticizers may be associated with fewer negative health effects.

"Surfactants" reduce surface tension of the liquids in which they are dissolved. "Dispersants" are compounds (often liquids or gases) that assist in dispersing small particles in a medium. "Emulsion stabilizers" or "emulsifiers" stabilizes emulsions (i.e., that enhance or promote the suspension of one liquid in another). Some chemical species can display surfactant, dispersant, and emulsifier properties.

A "filler" as used herein is an organic or inorganic compound, usually a solid, that can be used to increase the solids content of a composition, which may lead to a faster drying time. When fillers are used, lower amounts of polymeric components may be necessary; this can result in significant cost savings.

A "defoamer" or "de-foaming agent" is an additive that reduces or hinders the formation of foam in a chemical composition.

A "thickener" or "thickening agent" is an additive to a liquid composition that thickens or increases the viscosity of the liquid composition. This increase in viscosity does not substantially change the other properties of the liquid composition. Thickeners may also serve to stabilize emulsions and/or assist in keeping small solid particles in suspension.

"Cellulose" is a polymer of glucose that is the main structural component of the primary cell wall of green plants. Cellulose can be chemically modified in various ways to form "cellulose derivatives." For example, one or more hydroxyl groups can be substituted with a hydroxyalkyl group (e.g., hydroxymethyl, hydroxyethyl, etc.).

A "preservative" is an additive to a composition that extends the shelf life of the composition by preventing microbial growth and/or undesired chemical reactions. A preservative can be a "biocide" and, as such, can act to kill or inhibit the growth and reproduction of bacteria, fungi, and the like.

As used herein, a "propellant" is a pressurized gas in equilibrium with its own liquid form. When some propellant gas is released as an aerosolized product is dispensed, more of the liquid state of the propellant will evaporate, maintaining an even pressure in the pressurized container.

A "solvent" as used herein is a liquid that dissolves a solute. Solvents can be organic or non-organic or a combination thereof. In one aspect, water is the solvent for the compositions disclosed herein.

"Volatile organic compounds," abbreviated VOCs, are organic chemicals that have high vapor pressures at room temperature. Under standard atmospheric conditions, VOCs evaporate and enter the air. VOCs can reduce indoor air quality, may be responsible for some negative effects on human health, and can contribute to air pollution. In one aspect, the compositions disclosed herein are substantially free of VOCs. In one aspect, the compositions disclosed herein can be assessed for VOC levels using EPA Method 8250-B. In this aspect, VOCs may be as low as 0.0 g/mL.

"Backing" as used herein refers to one or more layers deposited on the back or bottom of an article. The backing layer comes directly into contact with an underlying substrate and is not typically seen or walked upon. A backing layer may exhibit tack or grip and prevent sliding or skidding across a horizontal surface.

A "substrate" is a horizontal surface to which an article coated with the compositions disclosed herein can be applied. The "backing" layer of the article comes into contact with the untreated substrate.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based solely on its presentation in a common group, without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range if each numerical value and sub-range was explicitly recited. As an illustration, a numerical range of "about 1 to about 5" should be interpreted to include not only the explicitly recited values of about 1 to about 5, but also to include individual values and sub-ranges within the indicated range. Thus, included in this numerical range are individual values such as 2, 3, and 4, the sub-ranges such as from 1-3, from 2-4, from 3-5, etc., as well as 1, 2, 3, 4, and 5, individually. The same principle applies to ranges reciting only one numerical value as a minimum or a maximum. Furthermore, such an interpretation should apply regardless of the breadth of the range or the characteristics being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc., of these materials are disclosed, that while specific reference to each various individual and collective combination and permutation of these compounds may not be explicitly disclosed, each is specifically contemplated and described herein. For example, if a filler is disclosed and discussed and a number of different polymers are discussed, each and every combination of filler and polymer that is possible is specifically contemplated unless specifically indicated to the contrary. For example, if a class of molecules A, B, and C are disclosed, as well as a class of molecules D, E, and F, and an example of a combination A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, and C; D, E, and F; and the example combination of A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of this disclosure including, but not limited to, steps in methods of making and using the disclosed compositions. Thus, if there are a variety of additional steps that can be performed with any specific embodiment or combination of embodiments of the disclosed methods, each such combination is specifically contemplated and should be considered disclosed.

In one aspect, provided herein is an anti-skid composition comprising:

(i) a first polymer comprising an acrylic polymer having a glass transition temperature from −5° C. to 5° C.;

(ii) a second polymer comprising a styrene acrylic copolymer having a glass transition temperature from −15° C. to 0° C.;

(iii) a third polymer comprising a styrene acrylic copolymer having a glass transition temperature from 20° C. to 30° C.;

(iv) a filler; and (v) a thickener comprising a derivative of cellulose.

In another aspect, any of the anti-skid composition described herein can be formulated as an aerosol-based composition by the addition of a propellant. Each component used to prepare the anti-skid compositions is described in detail below.

In one aspect, an all acrylic binder can be used as the first polymer. In this aspect, a commercial product having a high solids content (i.e., greater than 65%) can be used as the source of the first polymer. In one aspect, an all-acrylic binder sold under the trade name ENCOR® 9192 (Arkema Coating Resins) can be used as the source of the first polymer. In one aspect, the first polymer can be from 10% to 30% of the anti-skid composition. In another aspect, the first polymer can be 10%, 15%, 20%, 25%, or 30% of the anti-skid composition, where any value can be a lower or upper end-point of a range. In still another aspect, the first polymer has an average particle size of from 0.2 μm to 0.4 μm, or has an average particle size of about 0.3 μm. In this aspect, the average particle size of the first polymer can have a bimodal distribution. In another aspect, the first polymer can decrease the drying time of the anti-skid composition and can minimize long-term shrinkage of the dried composition. In a further aspect, the first polymer possesses little tack. In a still further aspect, the first polymer is clear when dried. In one aspect, the glass transition temperature of the first polymer is from about −5° C. to about 5° C., or is about −5° C., −4° C., −3° C., −2° C., −1° C., 0° C., 1° C., 2° C., 3° C., 4° C., or about 5° C.

In a further aspect, a styrene acrylic copolymer dispersion can be used as the second polymer. In this aspect, a commercial product having a high solids content can be used as the source of the second polymer. In one aspect, a styrene acrylic copolymer sold under the trade name ACRONAL® S400 (BASF) can be used as the source of the second polymer. In one aspect, the second polymer can be from 5% to 10% by weight of the anti-skid composition. In another aspect, the second polymer can be 5%, 6%, 7%, 8%, 9%, or 10% of the anti-skid composition, where any value can be a lower or upper end-point of a range. In still another aspect, the second polymer has an average particle size of from 0.1 μm to 0.3 μm, or has an average particle size of about 0.2 μm. In another aspect, the second polymer can impart structural flexibility to the anti-skid composition. In a further aspect, the second polymer increases the water resistance of the anti-skid composition. In a still further aspect, the second polymer imparts some overall grip to the anti-skid composition. In one aspect, the glass transition temperature of the second polymer is from −15° C. to 0° C., or is about −15° C., −14° C., −13° C., −12° C., −11° C., −10° C., −9° C., −8° C., −7° C., −6° C., −5° C., −4° C., −3° C., −2° C., −1° C., or about 0° C.

In another aspect, a styrene acrylic emulsion can be used as the third polymer. In this aspect, a commercial product can be used as the source of the third polymer. In one aspect, a styrene acrylic emulsion sold under the trade name SYCOAT® 123 (STI Polymer) can be used as the source of the third polymer. In one aspect, the third polymer can be from 5% to 10% by weight of the anti-skid composition. In another aspect, the third polymer can be 5%, 6%, 7%, 8%, 9%, or 10% of the anti-skid composition, where any value can be a lower or upper end-point of a range. In still another aspect, the third polymer has an average particle size of from 0.05 μm to 0.25 μm, or has an average particle size of about 0.15 μm. In a further aspect, the third polymer's small particle size offers increased penetration and increased overall water resistance to the anti-skid composition. In another aspect, the third polymer has no tack. In still another aspect, the third polymer can decrease the drying time of the anti-skid composition. In one aspect, the glass transition temperature of the third polymer is from 20° C. to 30° C., or is about 20° C., 21° C., 22° C., 23° C., 24° C., 25° C., 26° C., 27° C., 28° C., 29° C., or is about 30° C.

In another aspect, the anti-skid composition includes two polymers. In this aspect, the first polymer can be a high $T_g$ styrene-acrylic emulsion such as, for example, the commercial styrene-acrylic emulsion ENCOR® 9192 (Arkema) discussed previously. In this aspect, the first polymer can be from 50% to 60% by weight of the composition, or can be 50%, 51%, 52%, 53%, 54%, 55%, 56%, 57%, 58%, 59%, or 60% of the anti-skid composition, where any value can be a lower or upper end-point of a range. In this aspect, the second polymer can be a carboxylated styrene-butadiene rubber emulsion. In this aspect, the source of the second polymer can be a commercial product. In one aspect, a styrene-butadiene rubber latex sold under the trade name ROVENE® 4475 can be the source of the second polymer. In another aspect, the polymer can be from 20-30% of the composition, or can be 20%, 21%, 22%, 23%, 24%, 25%, 26%, 27%, 28%, 29%, or 30% by weight of the anti-skid composition, where any value can be the upper or lower end-point of a range. In still another aspect, the second polymer has an average particle size of from 0.05 μm to 0.25 μm, or has an average particle size of about 0.15 μm. In a further aspect, the second polymer has a $T_g$ of from 10° C. to 20° C., or of 10° C., 11° C., 12° C., 13° C., 14° C., 15° C., 16° C., 17° C., 18° C., 19° C., or 20° C.

In another aspect, the anti-skid composition includes a single polymer. In this aspect, the polymer can be a high $T_g$ styrene-acrylic emulsion. In this aspect, a commercial product can be used as the source of the polymer. In one aspect, a styrene acrylic emulsion sold under the trade name ENCOR® 145 (Arkema) can be used as the source of the polymer. In one aspect, the polymer can be from 80% to 90% by weight of the anti-skid composition. In another aspect, the polymer can be 80%, 81%, 82%, 83%, 84%, 85%, 86%, 87%, 88%, 89%, or 90% of the anti-skid composition, where any value can be a lower or upper end-point of a range. In still another aspect, the single polymer has an average particle size of from 0.05 μm to 0.25 μm, or has an average particle size of about 0.15 μm. In one aspect, the single polymer has a $T_g$ of from 27° C. to 37° C., of 27° C., 28° C., 29° C., 30° C., 31° C., 32° C., 33° C., 34° C., 35° C., 36° C., or 37° C. In a further aspect, the single polymer has a high molecular weight, a hydrophobic nature, mechanical strength, and chemical resistance. In this aspect, the single polymer dries with almost no tack.

In some aspects, the anti-skid composition includes a filler. Various fillers are contemplated. Examples of fillers useful herein include, but are not limited to, hollow or solid ceramic microspheres, clays, aluminum iron magnesium silicate, aluminum silicon oxide, aluminum silicate, calcium magnesium carbonate, calcium silicate hydrate, calcium carbonate, calcium metasilicate, silica anhydrite+kaolinite, magnesium aluminum silicate hydrate, magnesium aluminum silicate hydrate, magnesium silicate, magnesium silicate hydrate, silicon dioxide, silicon oxide, and mixtures thereof. In one aspect, MARBLEWHITE® 325 crushed limestone (i.e., calcium carbonate) manufactured by Minerals Technologies can be used as the filler. In another aspect, PANSIL® ULTRASPHERES 2000 (Tolsa USA, Inc.) hollow ceramic microspheres can be used as the filler. In still another aspect, 3M® Ceramic Microspheres W-410 (3M) can be used as the filler. The above list of compounds is not meant to be limiting and various other fillers known in the art are also considered and should be considered to be within the scope of this invention. In a further aspect, the average particle size of the filler is between 270 mesh (0.053 mm) and 400 mesh (0.037 mm), or is about 325 mesh (0.044 mm). In another aspect, the average particle size of the filler is 270 mesh, 300 mesh, 325 mesh, 350 mesh, 375 mesh, or 400 mesh, where any value can be a lower or upper end-point of a range. In another aspect, the particle size of the filler is from 1 μm to 10 μm ($90^{th}$ percentile) or is 1, 2, 3, 4, 5, 6, 7, 8, 9, or 10 μm, or is about 7.7 μm, where any value can be a lower or upper end-point of a range. In this aspect, the filler has a low surface-area-to-volume ratio allowing less loading than other fillers. Further in this aspect, the filler enhances fluid flow and imparts improved spray characteristics.

In one aspect, the filler is from 1% to 30% of the anti-skid composition. In another aspect, the filler can be 1%, 5%, 10%, 15%, 20%, 25%, or 30% of the anti-skid composition, where any value can be a lower or upper end-point of a range. In any of these aspects, the filler can contribute to overall mechanical stability and strength of the anti-skid composition and can assist in reducing the drying time of the anti-skid composition. In a further aspect, the filler imparts increased chemical resistance to the anti-skid composition.

In one aspect, the anti-skid composition includes a thickener. Various thickeners are contemplated. Examples of thickeners useful herein include, but are not limited to, cellulose and related polymers such as, for example, hydroxyethyl cellulose, hydroxypropyl cellulose, hydroxyethyl methyl cellulose, hydroxypropyl methyl cellulose, ethyl hydroxyethyl cellulose, carboxymethyl cellulose, and combinations thereof. In one aspect, CELLOSIZE® ER 30M hydroxyethyl cellulose manufactured by the Dow Chemical Company can be used as the thickener. In another aspect, TYLOSE® H3000 YP2 (SE Tylose GmbH & Co.) can be used as the thickener. In this aspect, the related polymers are derivatives of cellulose produced by chemical reactions. In one aspect, prior to hydration, the thickener has an average particle size of between 18 mesh (1 mm) and 25 mesh 0.707 mm), or of about 20 mesh (0.841 mm) prior to hydration. In another aspect, the thickener has an average particle size of less than 180 μm prior to hydration. In another aspect, the thickener is soluble in water. In a further aspect, the thickener is soluble in cold water.

In a still further aspect, the thickener can be from about 0.01% to 1% by weight of the anti-skid composition, or can be about 0.1%, about 0.2%, about 0.3%, about 0.4%, about 0.5%, about 0.6%, about 0.7%, about 0.8%, about 0.9%, or about 1% of the anti-skid composition. In one aspect, the thickener keeps the filler in suspension and/or prevents the filler from settling. In this aspect, preventing the filler from settling leads to a longer shelf life for the finished product.

In some aspects, the anti-skid composition also contains a plasticizer. Various phthalate and non-phthalate plasticizers are contemplated. In one aspect, the plasticizer is a non-phthalate plasticizer. In another aspect, the plasticizer sold under the trade names EASTMAN 168 ® (i.e., 1,4-benzenedicarboxylic acid, bis (2-ethylhexyl) ester) or BENZOFLEX® 2088 benzoate plasticizer manufactured by Eastman Chemical Company is useful as the plasticizer. In another aspect, K-FLEX® 500 dibenzoate plasticizer manufactured by Kalema is useful as the plasticizer. In one aspect, the plasticizer lowers the overall glass transition temperature of the anti-skid composition without softening and/or weakening the mechanical stability of the anti-skid composition. In another aspect, the plasticizer reacts minimally or not at all with common flooring materials and coatings for flooring materials such as, for example, polyurethane finishes for hardwood floors.

In another aspect, the anti-skid composition contains a surfactant. In some aspects, the surfactant can also act as a dispersant and/or an emulsion stabilizer. Various surfactants are contemplated. In one aspect, TRITON® X-405 nonionic, octylphenol ethoxylate surfactant manufactured by the Dow Chemical Company is useful herein. In a further aspect, the surfactant is premixed with the thickener and can provide ionic stability to the thickener, thereby allowing the thickener to swell (i.e., absorb water) without clumping or coagulating. In another aspect, the anti-skid composition contains a acid stabilizer and/or wetting agent such as, for example, the sulfated fatty acid sold under the trade name Modicol™ S (Henkel Corporation).

In other aspects, the anti-skid composition contains a de-foaming agent or defoamer. Various de-foaming agents are contemplated. One defoaming agent useful herein is FOAMASTER MO 2111 defoamer manufactured by BASF.

In still other aspects, the anti-skid composition contains a preservative. In one aspect, the preservative is also a biocide. In this aspect, the preservative can act to inhibit the growth of microorganisms in the container in which the anti-skid composition is stored. Various preservatives and biocides are contemplated. One preservative useful herein is BIO-CHEK® 721-M biocide manufactured by Lanxess.

In one aspect, the anti-skid composition contains a solvent. Various organic and non-organic solvents are contemplated. In one aspect, the solvent is water (i.e., the anti-skid composition is aqueous or "water-based"). In this aspect, the anti-skid composition is substantially free of organic solvents.

In another aspect, the anti-skid composition can be packaged into a spray can with one or more propellants to produce an aerosol-based anti-skid composition. Various propellants are contemplated. In this aspect, the propellant can be a fluorocarbon, an inert gas, a hydrocarbon gas, a hydrofluoroalkane, a hydrofluoroalkene, a volatile organic compound, or any combination thereof. In one aspect, the propellant is a single propellant. In another aspect, the aerosol anti-skid composition is substantially free of volatile organic compounds. In one aspect, the propellant can be from 10% by weight to 30% by weight of the aerosol-based anti-skid composition. In another aspects, the propellant can be 10%, 15%, 20%, 25%, or 30% by weight of the aerosol-based anti-skid composition, where any value can be a lower or upper end-point of a range. In a further aspect, the propellant can be HFC-152a, also known as 1,1-difluoroethane.

In another aspect, a method is provided for making an anti-skid composition, the method comprising:

(a) admixing a first polymer, a second polymer, and a third polymer as defined herein to form a first polymer composition;

(b) adding in alternating portions a filler and a plasticizer to the first polymer composition to produce a second polymer composition;

(c) adding a defoamer and a preservative to the second polymer composition to produce a third polymer composition; and (d) adding a composition comprising water, a surfactant, a second portion of defoamer, and a thickener to the third polymer composition to produce an anti-skid composition.

With respect to step (a), the first, second, and third polymer can be added to one another in any order. In one aspect, the second and third polymer are admixed first, followed by the addition of the first polymer. In step (b), the filler and plasticizer are added in alternating portions (i.e., stepwise) to the polymer mixture. The stepwise addition of the filler with the plasticizer prevents undesirable clumping, which ensures a uniform and consistent dispersion of the filler throughout the polymer composition. The amount of filler and plasticizer used will determine the number of step needed when adding the filler to the polymer composition. Water can be added during the addition of the filler and plasticizer to help maintain mixing and dispersion of the filler throughout the polymer composition. After the addition of the filler and plasticizer, additional components such as a defoamer and/or a preservative can be added to the polymer composition. Additional water can also be added before the addition of the defoamer and preservative.

To the polymer composition above is added a composition comprising water, a surfactant, a second portion of defoamer, and a thickener to the third polymer composition to produce an anti-skid composition. In one aspect, when the thickener is a derivative of cellulose, the surfactant permits the cellulose derivative to fully swell without clumping and coagulation. This composition can be added to the polymer composition produced above and admixed for a sufficient time to ensure the all components are evenly dispersed throughout the anti-skid composition.

After preparation of the anti-skid composition, the anti-skid composition can be packaged with a propellant in an industry standard pressurized delivery device such as, for example, aerosol cans or propane type cylinders fitted with a suitable valve system and nozzle. In this aspect, the filler and thickener are selected to have physical attributes that are fully compatible with a pressurized aerosol delivery device.

In still another aspect, a method for preventing an article from skidding on a substrate surface is provided. In one aspect, the method comprises (a) applying the anti-skid composition disclosed herein to the surface of an article, (b) allowing the anti-skid composition to dry, and (c) applying the treated surface of the article to the substrate surface. In this aspect, the anti-skid composition can be applied at room temperature and atmospheric pressure by a method including dipping, troweling, painting, trigger-spraying, or any other coating method known in the art. In an alternative aspect, the anti-skid composition can be applied from a spray can after having been mixed with a propellant. In either of these aspects, the compositions are preferably applied in an area with adequate ventilation. Further in these aspects, the article to which the anti-skid compositions are applied requires no pre-treatment other than being clean and dry.

Various articles are contemplated herein. In one aspect, the article can be a carpet, a rug, carpet tile, a floor mat, a door mat, an entrance mat, a runner, or a chair mat. Various substrates are also contemplated herein. In one aspect, the substrate can be a hardwood floor, a laminate floor, tile, linoleum, concrete, cork flooring, bamboo flooring, vinyl flooring, carpet, rubber flooring, slate, marble, or a combination thereof.

In any of the above aspects, the article can be lifted from the substrate. In a further aspect, the anti-skid composition stays on the article and does not transfer to the substrate.

Also provided herein is an article treated with an anti-skid composition or an aerosol anti-skid composition as disclosed herein.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions (e.g., component concentrations, desired solvents, solvent mixtures, temperatures, pressures, and other reaction ranges and conditions) that can be used to optimize the product purity and yield obtained from the described process. Only reasonable and routine experimentation will be required to optimize such process conditions.

Anti-Skid Composition

A non-skid carpet backing composition was prepared using the ingredients in the proportions listed in Table 1.

TABLE 1

Raw Materials for Non-Skid Carpet Backing Composition

| Component | Amount (Weight % of Composition) |
|---|---|
| ENCOR ® 9192 | 27.5 |
| MARBLEWHITE ® 325 | 20 |
| SYCOAT ® 123 | 15.5 |
| Water | 15 |
| ACRONAL ® S400 | 12.3 |
| EASTMAN 168 ® | 9 |
| TRITON ™ X-405 | 0.3 |
| FOAMASTER ® MO 2111 | 0.2 |
| CELLOSIZE ® ER-30M | 0.1 |
| BIOCHEK ® 721-M | 0.1 |

Procedure for Making Anti-Skid Composition

A Premix was synthesized by adding the following ingredients in order, with continuous mixing:
1. Add to a first vessel water equal to 10% by weight of the final composition
2. Add all TRITON™ X-405 to the vessel
3. Mix for 15 minutes
4. Add an amount of FOAMASTER® MO 2111 equal to 0.1% by weight of the final composition to the vessel
5. Slowly, add all CELLOSIZE® ER-30M to the vessel
6. Mix for 20 minutes
7. Set aside finished Premix Separately, the following components were added to a second vessel in the following order, again with continuous mixing:
1. Add to a vessel all SYCOAT® 123
2. Add all ACRONAL® S400 to the vessel
3. Mix for 15 minutes
4. Add all ENCOR® 9192 to the vessel
5. Mix for 10 minutes
6. Slowly add to the vessel an amount of MARBLEWHITE® 325 equal to 10% by weight of the final composition
7. Mix for 15 minutes
8. Add an amount of water equal to 2.5% by weight of the final composition to the vessel
9. Mix for 10 minutes
10. Add to the vessel an amount of EASTMAN 168® equal to 5% by weight of the final composition
11. Mix for 10 minutes
12. Slowly add 5% by weight of the final composition of MARBLEWHITE® 325
13. Mix for 15 minutes
14. Add 4% by weight of the final composition of EASTMAN 168®
15. Mix for 10 minutes
16. Slowly add 5% by weight of the final composition of MARBLEWHITE® 325
17. Stir for 15 minutes
18. Add 2.5% by weight of the final composition of water
19. Mix for 10 minutes
20. Add 0.1% by weight of the final composition of FOAMASTER® MO 2111
21. Add all BIOCHEK® 721 M
22. Mix for 15 minutes
23. Add all Premix
24. Mix for 30 minutes Aerosol-Based Composition The anti-skid composition described previously was added to an aerosol can with a propellant in the proportions given in Table 2:

TABLE 2

Aerosol Non-Skid Carpet Backing Composition

| Component | Amount (Weight % of Composition) |
|---|---|
| Non-Skid Carpet Backing | 85 |
| HFC-152a (fluorocarbon propellant) | 15 |

Throughout this application, various publications are referenced. The disclosures of these publications in their entireties are hereby incorporated by reference into this application in order to more fully describe the compounds, compositions, and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed:
1. An aerosol-based anti-skid composition comprising:
 (a) an anti-skid composition comprising:
  (i) a first polymer comprising an acrylic polymer having a glass transition temperature from −5° C. to 5° C.;
  (ii) a second polymer comprising a styrene acrylic copolymer having a glass transition temperature from −10° C. to 0° C.;
  (iii) a third polymer comprising a styrene acrylic copolymer having a glass transition temperature from 20° C. to 30° C.;
  (iv) a filler comprising calcium carbonate in the amount of from 10% to 30% by weight of the anti-skid composition;
  (v) a thickener comprising hydroxyethyl cellulose; and
  (vi) a plasticizer comprising a non-phthalate plasticizer, and
 (b) a propellant.
2. The composition of claim 1, wherein the first polymer comprises an average particle size of from 0.2 μm to 0.4 μm.
3. The composition of claim 1, wherein the second polymer is from 5% to 10% by weight of the anti-skid composition.
4. The composition of claim 1, wherein the second polymer comprises an average particle size of from 0.1 μm to 0.3 μm.
5. The composition of claim 1, wherein the third polymer is from 5% to 10% by weight of the anti-skid composition.

6. The composition of claim 1, wherein the third polymer comprises an average particle size of from 0.05 µm to 0.25 µm.

7. The composition of claim 1, wherein the calcium carbonate has an average particle size of between 270 mesh and 400 mesh.

8. The composition of claim 1, wherein the thickener comprises an average particle size of between 18 mesh and 25 mesh prior to hydration.

9. The composition of claim 1, wherein the thickener is from 0.01% to 1% of the anti-skid composition.

10. The composition of claim 1, wherein the plasticizer is bis (2-ethylhexyl) ester of 1,4-benzenedicarboxylic acid.

11. The composition of claim 1, wherein the anti-skid composition further comprises a surfactant, a de-foaming agent, a preservative, or a combination thereof.

12. The composition of claim 1, wherein the anti-skid composition comprises a surfactant and the surfactant comprises a nonionic, octylphenol ethoxylate surfactant.

13. The composition of claim 1, wherein the anti-skid composition comprises water.

14. The composition of claim 1, wherein the aerosol-based anti-skid composition is free of a volatile organic compound.

15. The composition of claim 1, wherein the propellant comprises a fluorocarbon, an inert gas, a hydrocarbon gas, a hydrofluoroalkane, a hydrofluoroalkene, a volatile organic compound, or any combination thereof.

16. The composition of claim 1, wherein the propellant is a single propellant.

17. The composition of claim 1, wherein the propellant comprises a blend of two or more propellants.

18. The composition of claim 1, wherein the propellant is from 10 to 30% by weight of the aerosol-based anti-skid composition.

19. The composition of claim 1, wherein the propellant is 1,1-difluoroethane.

20. An anti-skid composition comprising:
   (i) a first polymer comprising an acrylic polymer having a glass transition temperature from −5° C. to 5° C.;
   (ii) a second polymer comprising a styrene acrylic copolymer having a glass transition temperature from −15° C. to 0° C.;
   (iii) a third polymer comprising a styrene acrylic copolymer having a glass transition temperature from 20° C. to 30° C.;
   (iv) a filler comprising calcium carbonate in the amount of from 10% to 30% by weight of the anti-skid composition;
   (v) a thickener comprising hydroxyethyl cellulose, and
   (vi) a plasticizer comprising a non-phthalate plasticizer.

21. An anti-skid composition produced by the method comprising:
   (a) admixing a first polymer, a second polymer, and a third polymer to form a first polymer composition;
   (b) adding in alternating portions a filler and a plasticizer to the first polymer composition to produce a second polymer composition;
   (c) adding a defoamer and a preservative to the second polymer composition to produce a third polymer composition; and
   (d) adding a composition comprising water, a surfactant, a second portion of defoamer, and a thickener to the third polymer composition to produce the anti-skid composition,
      (1) wherein the first polymer comprises an acrylic polymer having a glass transition temperature from −5° C. to 5° C.;
      (2) the second polymer comprises a styrene acrylic copolymer having a glass transition temperature from −15° C. to 0° C.;
      (3) the third polymer comprises a styrene acrylic copolymer having a glass transition temperature from 20° C. to 30° C.;
      (4) the filler comprises calcium carbonate in the amount of from 10% to 30% by weight of the anti-skid composition;
      (5) the thickener comprises hydroxyethyl cellulose, and
      (6) the plasticizer comprises a non-phthalate plasticizer.

22. An anti-skid composition produced by the method of claim 21.

23. An aerosol-based anti-skid composition comprising the anti-skid-composition of claim 21 and a propellant.

* * * * *